July 8, 1958     J. P. BRUCK ET AL     2,842,170
SABER SAW STRUCTURE

Filed Jan. 18, 1956     3 Sheets—Sheet 1

INVENTOR.
John P. Bruck
BY Frank W. Mittins
D. Emmett Thompson
Attorney

July 8, 1958  J. P. BRUCK ET AL  2,842,170
SABER SAW STRUCTURE

Filed Jan. 18, 1956  3 Sheets-Sheet 2

INVENTOR.
John P. Bruck
BY Frank W. Mittins
D. Emmett Thompson
Attorney

July 8, 1958

J. P. BRUCK ET AL 2,842,170

SABER SAW STRUCTURE

Filed Jan. 18, 1956

INVENTORS
John P. Bruck
Frank W. Mittins
BY D. Emmett Thompson
Attorney

United States Patent Office 2,842,170
Patented July 8, 1958

2,842,170
SABER SAW STRUCTURE

John P. Bruck, Toledo, Ohio, and Frank W. Mittins, Memphis, N. Y., assignors to The Porter-Cable Machine Company, Syracuse, N. Y., a corporation of New York Application January 18, 1956, Serial No. 559,876

4 Claims. (Cl. 143—68)

This invention has to do with power operated saws of the type employing a reciprocating saw blade. Saws of this type comprise a housing attached to a base plate or table, and have a saw blade holder mounted for reciprocation in the housing in a direction perpendicular to the base plate. The teeth on the cutting edge of the blade are shaped to cut the material upon movement of the blade, through the apertured base plate, in a direction toward the housing—that is, the material being cut is pulled against the base plate during the cutting stroke of the blade.

In recent years, saws of this general type have been developed as portable hand manipulated machines particularly advantageous in use for many cutting operations, and are generally known as saber saws. Cutting tools of this type, however, universally have one disadvantage in that they chip the surface of the material engaged by the base plate or table of the machine. This chipping is caused by the teeth of the blade, or tool, pulling upwardly or outwardly through the surface of the material being cut.

The extent of this chipping depends on the kind of material being cut. These machines are particularly advantageous in cutting panel material used for interior trim, table tops, etc., and the chipping of the material is therefore particularly objectionable.

In machines of this type, it is not practical to make the aperture in the base plate or table close fitting to the sides of the saw blade. This is due to variations and inaccuracies in the machining of the parts of the machine, variation in the thickness of the blades used, and in lateral vibration of the blades during the cutting operation. When the material being cut is used for cabinet work and the like, the chipped edge of the material is particularly unsightly, as above stated.

This invention has as an object a saber saw structure embodying an arrangement effective to prevent chipping of the work piece by the saw blade.

The invention has as a further object a power operated saber saw structure including an insert mounted in the base plate and having free lateral movement relative to the base plate, the insert being formed with a saw blade receiving slot having the side walls thereof extending in close proximity to the sides of the saw blade.

The invention consists in the novel features and in the combinations and constructions hereinafter set forth and claimed.

In describing this invention, reference is had to the accompanyng drawings in which like characters designate corresponding parts in all the views.

Figure 1:
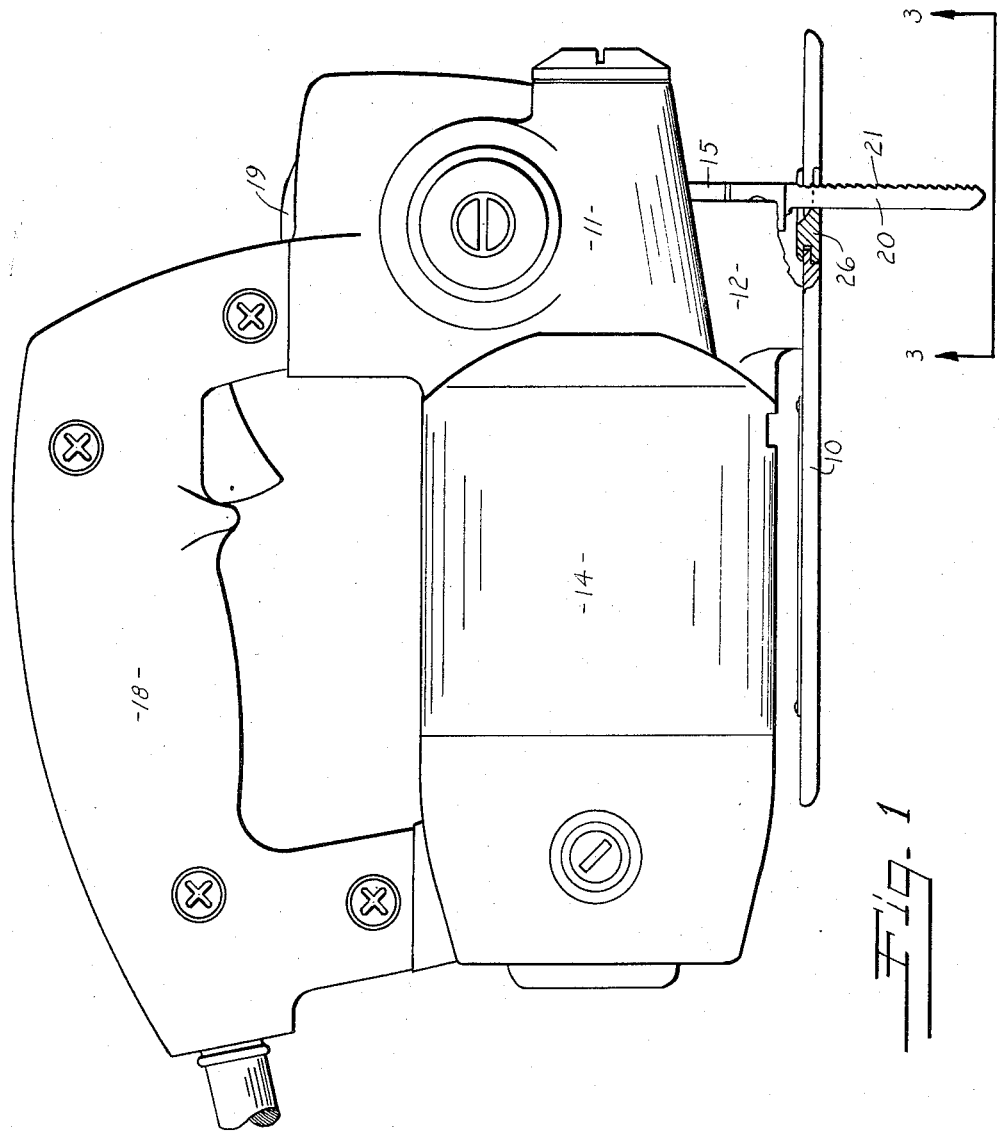
Figure 1 is a side elevational view of a power operated saber saw embodying our invention showing a portion of the base plate in section.

The saber saw herein disclosed is of the power operated hand manipulated type consisting of a base plate 10 adapted to engage a surface of the board or other work piece being cut. A housing is mounted on the base plate and, in this instance, consists of a gear chamber 11 having a depending boss 12 secured to the base plate 10, as by screws 13, the screws extending upwardly through the base plate and being threaded into the boss 12.

The housing further includes a motor compartment 14 in which an electric motor is mounted and is operatively connected to a saw blade holder 15 through gearing mounted in the gear compartment 11. The saw blade holder 15 is mounted for reciprocation in the gear compartment of the housing for movement toward and from the base plate. The saw is provided with a handle 18 secured to the top side of the housing, and a second handle in the form of a guiding knob 19 extending laterally from the gear compartment 11. The motor mounted in the motor compartment 14 is operable to effect reciprocation of the blade holder 15 through gearing and other motion transmitting mechanism contained in the gear compartment. This general structural arrangement of the machine is similar to that disclosed in Patent No. 2,737,987, issued March 13, 1956, to John P. Bruck.

Figure 3:
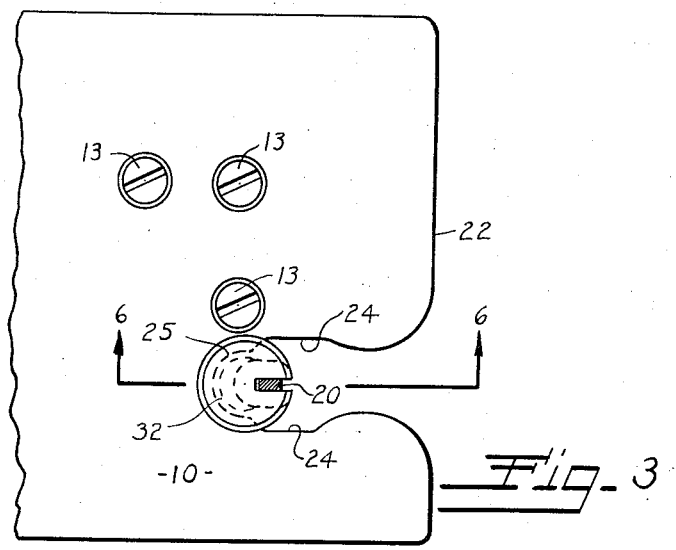
Figure 3 is a bottom plan view of the right hand portion of Figure 1, the view being indicated by the line 3—3, Figure 1.

The base plate 10 is formed with an opening through which a saw blade 20 extends. The upper end of this blade is fixedly secured to the lower end of the blade holder 15. The forward edge of the blade is formed with teeth 21 which are constructed to cut the work piece upon movement of the blade upwardly through the base plate 10, or toward the gear compartment 11. The opening in the base plate 10 is preferably in the form of a slot extending inwardly from the forward edge 22 of the base plate, as shown in Figure 3. The advantage of this opening being in the form of a slot is that the operator can better observe and follow the guide mark on the work piece. The side walls of this slot are indicated at 24, and these side walls merge at their inner ends with a curved wall 25 of semi-circular form, the side walls 24 of the slot converging at their inner ends to join the curved wall portion 25, see Figure 3.

Figure 2:
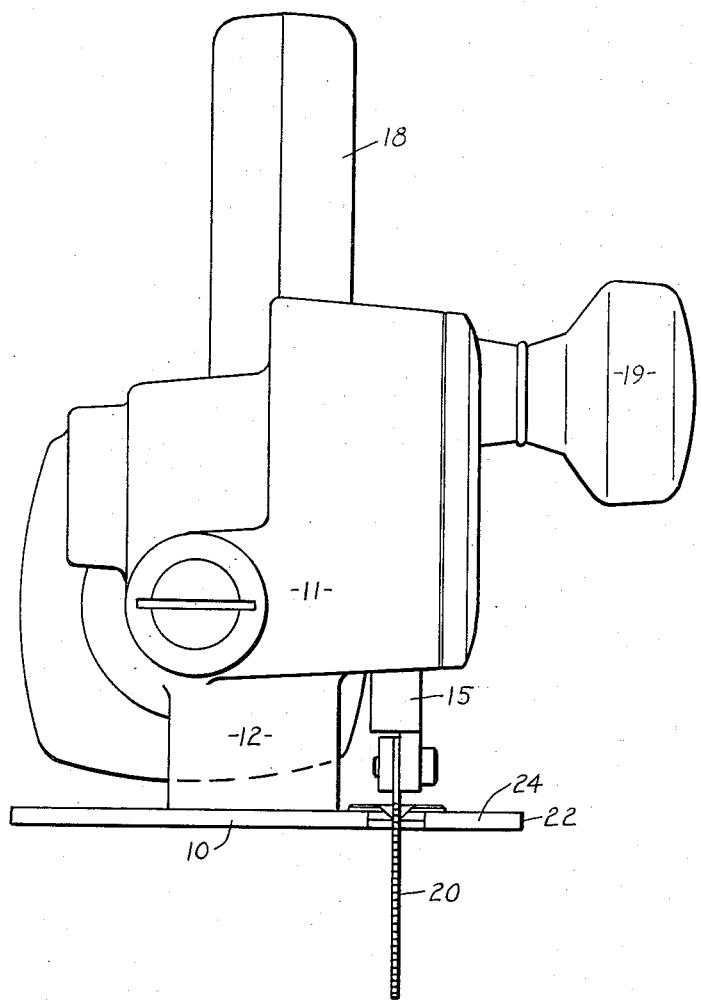
Figure 2 is a front elevational view of the structure shown in Figure 1.
Figure 4:
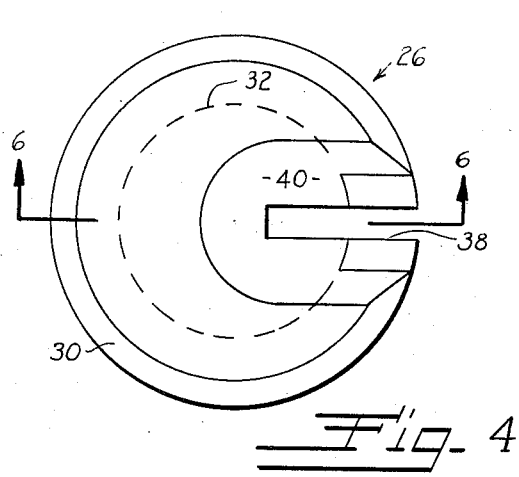
Figure 4 is an enlarged top plan view of the insert.
Figure 5:
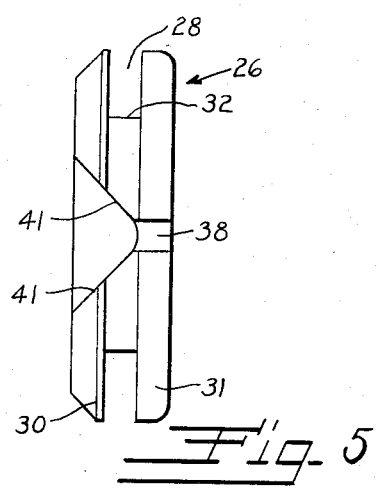
Figure 5 is an enlarged side view of the insert looking toward the left, Figure 4.
Figure 6:
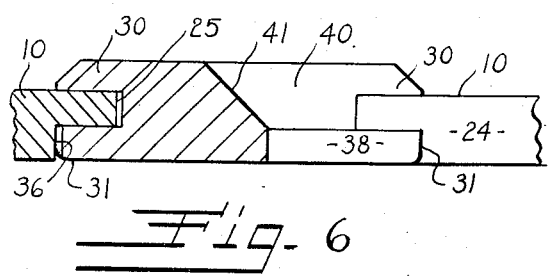
Figure 6 is a view taken on line 6—6, Figures 3 and 4.

An insert member, designated generally at 26 and best shown in the enlarged views, Figures 4 and 5, is mounted on the base plate in registration with the inner portion of the opening or slot. In the arrangement disclosed herein, the insert is of general circular shape and is formed at its periphery with a circumferentially extending groove 28 providing at its peripheral portion an upper flange 30 and a lower flange 31. The circular center portion of the insert defined by the bottom wall 32 of the groove 28 extends on a radius somewhat less than the radius on which the inner curved wall 25 of the slotted opening is formed. The under side or surface of the base plate 10 is formed with a circular recess 36 formed about a center coincident with the center about which the inner curved wall 25 of the opening is formed. This circular recess 36 has a depth complemental to the thickness of the lower flange 31 of the insert whereby when the insert is positioned in the base plate, as shown in Figures 1, 2 and 6, the lower surface of the insert is positioned flush with the lower surface of the base plate 10 and the upper circular flange 30 overlies the upper surface of the base plate about the opening.

With this arrangement, the insert is permitted a free lateral movement of small magnitude relative to the base plate. This arrangement also provides means for restraining the movement of the insert in a plane perpendicular to the base plate 10.

The side walls 24 of the slotted opening are spaced apart a distance equal to at least the outer diameter of the insert to permit insertion of the insert in the slot and its movement rearwardly into the recessed portion of the base plate. The insert is formed with a slot 38 extending inwardly from one edge thereof and this slot has a width comparable to the thickness of the saw blade—that is, the side walls of the slot extend in close proximity to the sides of the saw blade 20. Accordingly, the supporting surface of the machine provided by the base plate extends in close proximity to the sides of the saw blade whereby, upon upward movement or movement of the saw blade toward the base plate, the blade will not chip or remove particles from the upper surface of the work piece along each side of the saw kerf.

Ordinarily in machines of this type, the base plate or table, or insert member, such as is sometimes used in jig saws and band saws, are all provided with slots considerably wider than the saw blade and accordingly have no effect in preventing chipping of the work piece. In our structure however, the saw blade receiving slot formed in the insert can be dimensioned very close to the thickness of the blade because the insert is mounted for free lateral movement. The reason for the relatively great clearance in prior structures was necessitated by inherent inaccuracies in the manufacture and assembly of the various parts of the machine, and in the changing of the saw blades from one thickness to another. With our arrangement, an insert can be mounted on the base plate and be formed with a slot having a close fit for a saw blade of given thickness but yet no binding or excessive wear will occur due to the free lateral movement of the insert relative to the base plate.

The insert is preferably formed with a recess 40 in the marginal portion of the top surface of the insert about the slot 38. The side walls of this recess incline, as at 41, Figures 5 and 6. This incline marginal area of the top surface of the insert provides for more ready disposal of the sawdust resulting from the cutting operation.

What we claim is:

1. A saber saw structure comprising a base plate adapted to be moved on the surface of the work piece and being formed with an opening, a housing mounted on the base plate, a saw blade holder mounted for vertical reciprocation in said housing toward and from the base plate, a vertically disposed saw blade carried by said holder and extending downwardly through the opening in the base plate and being formed with teeth on its forward edge for cutting the work piece on its stroke toward the base plate, an insert positioned on said plate in registration with said opening therein, said insert having a surface extending substantially flush with the work engaging surface of the base plate and being formed with a saw blade receiving aperture positioned in close proximity to the sides of said saw blade, and said insert and base plate having means cooperable to detachably secure said insert to the base plate against vertical movement of said insert, said attaching means providing free floating limited lateral movement of said insert relative to the base plate.

2. A saber saw structure as defined in claim 1, wherein the aperture in said insert is in the form of a slot extending inwardly from one edge thereof, and the insert being arranged on the base plate with the closed end of said slot confronting the back edge of the saw blade.

3. A portable, power-operated, saber saw structure comprising a base plate adapted to engage the surface of the work piece and being formed with an opening having forward and rear portions and spaced apart side walls, a housing mounted on the base plate, a saw blade holder mounted for reciprocation in said housing toward and from the base plate, a saw blade carried by said holder and extending downwardly through the opening in said base plate, an insert, the side walls of the forward portion of said opening in the base plate being spaced apart to receive said insert, said base plate at the rear portion of said opening therein and said insert being provided with a tongue and groove formation for slidably interlocking the insert to the base plate, said tongue and groove formation being dimensioned to provide for limited free floating lateral movement of said insert relative to the base plate, said insert being formed with a saw blade receiving slot with the side walls thereof extending in close proximity to the sides of the blade and the closed end of the slot confronting the back edge of the blade, whereby the blade serves to maintain the insert in said rear portion of the opening in the base plate and the tongue and groove formation in interlocking relation.

4. A portable, power-operated, saber saw structure comprising a base plate adapted to engage the surface of the work piece and being formed with an opening having forward and rear portions and spaced apart side walls, a housing mounted on the base plate, a saw blade holder mounted for reciprocation in said housing toward and from the base plate, a saw blade carried by said holder and extending downwardly through the opening in said base plate, an insert formed with upper and lower spaced apart flanges, the side walls of the forward portion of the opening in the base plate being spaced apart to receive said insert, the under side of the base plate being recessed about the rear portion of said opening to provide a tongue for slidable locking engagement between the flanges of said insert upon insertion of the insert in the forward portion of said opening and movement of the insert to the rear portion of said opening, said tongue and flanges being dimensioned to provide for limited free floating lateral movement of the insert relative to the base plate, said insert being formed with a saw blade receiving slot with the side walls thereof extending in close proximity to the sides of the blade and the closed end of the slot confronting the back edge of the blade, whereby the blade serves to maintain the insert in said rear portion of the opening in the base plate and the tongue and flanges in interlocking engagement.

References Cited in the file of this patent

UNITED STATES PATENTS

| | | |
|---|---|---|
| 399,847 | Dearing | Mar. 19, 1889 |
| 461,325 | Deniston | Oct. 13, 1891 |
| 1,164,669 | Steinman | Dec. 21, 1915 |
| 1,502,088 | Colby | July 22, 1924 |
| 1,975,314 | Cross | Oct. 2, 1934 |
| 2,472,570 | Christie | June 7, 1949 |
| 2,639,737 | Forsberg | May 26, 1953 |

UNITED STATES PATENT OFFICE
CERTIFICATE OF CORRECTION

Patent No. 2,842,170                      July 8, 1958

John P. Bruck et al.

It is hereby certified that error appears in the above numbered patent requiring correction and that the said Letters Patent should read as corrected below.

Column 2, line 31, for "2,737,987" read -- 2,737,984 --.

Signed and sealed this 7th day of January 1964.

(SEAL)
Attest:

ERNEST W. SWIDER
Attesting Officer

EDWIN L. REYNOLDS
Acting Commissioner of Patents